June 2, 1931.   W. C. McGAFFIC   1,808,427
COMPARTMENT TANK CONSTRUCTION
Filed Dec. 7, 1929
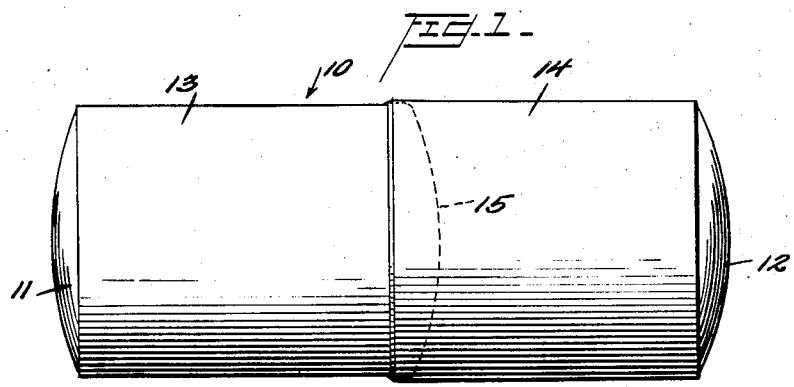
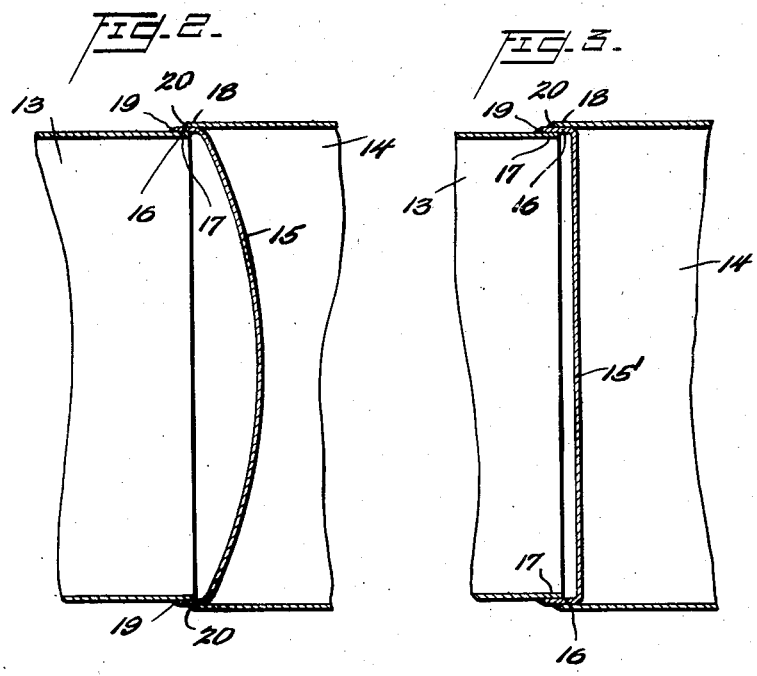
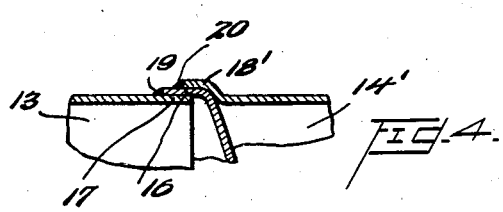

Patented June 2, 1931

1,808,427

UNITED STATES PATENT OFFICE

WALTER C. McGAFFIC, OF BUFFALO, NEW YORK

COMPARTMENT TANK CONSTRUCTION

Application filed December 7, 1929. Serial No. 412,456.

This invention relates to compartment tank constructions, and more particularly to sheet metal tanks which are provided with bulkheads so disposed as to divide the tank into two or more compartments adapted to receive various materials, especially fluids or pulverent solids, for the purposes of transport or storage.

Tanks of this general type have heretofore been provided with one or more bulkheads between each compartment, the bulkheads being joined to the wall of the tank by riveting and calking or by welding, but in all such cases, the construction has been such that in the event of the loosening or breaking of a riveted or welded joint due to faulty assemblage and rough handling or accident, material from one compartment would leak through the joint into an adjacent compartment and dilute, contaminate, or spoil the material therein.

Furthermore, in many former welded constructions the bulkheads and tank wall members were joined by means of inside welding, which is difficult of accomplishment initially, and provides joints which are practically inaccessible for purposes of repair after the tank is completed.

Therefore, in order to obviate these difficulties and disadvantages of prior constructions, it is the principal object of this invention to provide a compartment tank in which the partitions or bulkheads are so joined to the wall members that inadvertent leakage of material from any compartment through the joints will merely result in a loss of material from such compartment, and leakage of material from one compartment into another will be prevented.

Another object of the invention is the provision of a compartment tank of this general nature in which each compartment may be considered an independent tank, there being no rivets, perforations, or welds which are common to more than one of said compartments.

Further objects and features of novelty will be apparent from the following specification when read in connection with the accompanying drawings in which several embodiments of my invention are illustrated by way of example:

Figure 1 is a side elevation of a two compartment tank embodying the principles of my invention;

Figures 2 and 3 are sectional detail views of two forms of bulkheads showing the means for connecting them with the walls of adjacent compartments; and Figure 4 is a fragmentary sectional view showing an alternative form of joint between compartments.

In Figure 1 of the drawings, the numeral 10 designates a two compartment tank which comprises end bulkheads 11 and 12, tubular tank wall members 13 and 14 and an intermediate bulkhead 15. It is apparent, however, that the tank may be divided into any desired number of compartments by the mere multiplication of the tubular members 13 and 14 and the interposition of the necessary number of intermediate bulkheads 15. The tank 10 may be of circular, oval or any other desired cross section, and the bulkheads may be of a convex or dished formation, as illustrated in Figure 1, or they may be made flat as in the case of the intermediate bulkhead 15' in Figure 3. They may also be provided with strengthening or reinforcing corrugations if desired.

An essential feature of the invention is the disposition of the intermediate bulkheads 15 and 15' with relation to the tubular wall members 13 and 14, and the method of joining these elements, and this feature will now be described. The intermediate bulkheads 15 or 15' are each provided with a peripheral flange 16 of the same general contour as the adjacent ends 17 and 18 of tubular wall members 13 and 14 respectively, the internal diameter of this flange 16 being but slightly greater than the external diameter of the end 17 and the external diameter of the flange 16 being slightly less than the internal diameter of the end 18.

A preferred mode of assembling such a tank is to fit the preformed partition bulkhead 15 or 15' over the end 17 of the section 13, fit the end 18 of the next tubular member 14 over the bulkhead flange 16, and, by means of a torch, electric arc, or other means, form continuous welds around the edges of the flange 16 and end 18 of the member 14 as at 19 and 20, respectively. The compartment sections may, of course, be separately and consecutively welded to the bulkhead flanges 16, if desired. Any convenient number of sections may thus be built up to provide a compartment tank of the desired capacity and requirements with reference to the variety of materials which are to be stored or transported.

Where it is desired to have all of the compartments of the same diameter, the outer sections 14′, as shown in Figure 4, may be constructed with an expanded flange 18′ which is adapted to overlie and be welded to the bulkhead flange 16 as in the other embodiments.

It will thus be apparent that the compartments formed within the sections 13 and 14 are substantially separate, independent tank units, and that, in the event of leakage of material therefrom through the welded joints 19 or 20, the material from one of the compartments cannot pass into another compartment to contaminate the material therein, but will merely pass out into the atmosphere and either drop to the ground or be dissipated in some manner according to the nature of the material and the location of the tank. Furthermore, upon the occurrence of a break, these welded joints 19 and 20 may be readily repaired from the outside of the tank.

Such a construction as is afforded by this invention may be advantageously used in the fabrication of truck tanks for the transportation and delivery of gasoline, oil, or other commodities of different kinds and grades; of storage tanks for such materials adapted to be disposed either underground or otherwise; or of any other type of compartment container which may suggest itself to the user.

The embodiments illustrated and described are exemplary only and it is obvious that various changes and modifications may be made therein within the scope of the invention as defined by the following claims.

Having thus described the invention, what is claimed as new and desired to be secured by Letters Patent is:

1. In a compartment tank, in combination, two or more tubular members arranged end to end and forming walls of tank compartments, and a single bulkhead plate forming a common wall for adjacent compartments, a peripheral portion of said plate being interposed between adjacent ends of two tubular members and permanently fastened and sealed to each of said members, whereby any leakage occurring through the joint between either tubular member and the bulkhead plate will pass to the outside of the tank.

2. In a compartment tank construction, in combination, two or more tubular sheet metal members arranged end to end and forming walls of adjacent tank compartments, and a bulkhead forming a common dividing wall between such compartments, and provided with a peripheral flange adapted to interiorly receive one of said ends and to extend within the other of said ends, said flange being permanently fastened and sealed to each of said ends.

3. In a compartment tank construction, in combination, two or more tubular sheet metal members arranged end to end and forming walls of adjacent compartments, and a bulkhead forming a common dividing wall for such compartments, and comprising a single metal plate provided with a peripheral flange adapted to interiorly receive one of said ends and to extend within the other of said ends, said flange being separately and permanently fastened and sealed to each of said ends.

4. A metal compartment tank construction comprising a plurality of tubular members arranged end to end and forming walls of the tank compartments, and partitions disposed between adjacent ends of certain of said members and adapted to divide the tank into compartments, each of said partitions comprising a single piece of sheet metal having a peripheral flange projecting from one side thereof, adapted to overlap one of said adjacent ends and to be overlapped by the other of said ends, and separate welds fastening and sealing said flange to said respective ends.

5. In a compartment tank construction, in combination, a transverse bulkhead or dividing plate provided with a peripheral flange extending substantially normally thereto, a tubular shell forming a wall of one compartment and having an end thereof fitting closely within the flange portion of said bulkhead, a second tubular shell, one end of which extends over and closely fits the periphery of said flanged bulkhead, and independent welds permanently fastening said shells to said bulkhead.

6. The method of assembling a compartment tank provided with substantially aligned tubular shells and a transverse peripherally flanged bulkhead or dividing plate, which comprises telescoping the end of one of said tubular members within the peripheral flange of said bulkhead, fastening and sealing said elements together, telescoping said bulkhead within the adjacent end of the other tubular member and fastening and sealing said last named elements together.

In testimony whereof I hereunto affix my signature.

WALTER C. McGAFFIC.